INVENTOR.
WALTER O. STANTON
BY
Kane, Dalsimer and Kane
ATTORNEYS

INVENTOR.
WALTER O. STANTON
BY
Kane, Dalsimer and Kane
ATTORNEYS

INVENTOR.
WALTER O. STANTON
BY Kane, Dalsimer and Kane
ATTORNEYS

INVENTOR.
WALTER O. STANTON
BY
Kane, Dalsimer and Kane
ATTORNEYS 3,146,319

MAGNETIC PHONOGRAPH PICKUP WITH COMPENSATING POLE PIECE ARRANGEMENT

Walter O. Stanton, Laurel Hollow, N.Y., assignor to Pickering & Company, Inc., a corporation of New York Filed Aug. 24, 1960, Ser. No. 51,638
10 Claims. (Cl. 179—100.41)

This invention relates to an improved magnetic pickup, particularly of the stereophonic type.

Among the objects of the present invention are:

(1) The provision of an improved, efficient magnetic phonograph pickup which develops a strong signal response relatively free from distortion.

(2) The provision of an improved stereophonic magnetic phonograph pickup which is relatively free from cross-talk between the channels, but at the same time is of compact design with a moving system of relatively low mass so as to minimize record wear.

(3) The provision of a magnetic phonograph pickup of improved design which substantially eliminates hum or extraneous noises which result from stray currents and external fields.

(4) The provision of an improved magnetic phonograph pickup, particularly of the stereophonic type having an improved replaceable moving system assembly which may be readily removed and replaced by the ordinary user or operator without the necessity of employing specially trained service personnel and without returning the cartridge to a factory or service station.

(5) The provision of an improved replaceable moving system assembly for magnetic phonograph pickups, particularly of the stereophonic type, which is readily removable and replaceable having a moving system of relatively low mass to minimize record wear with an improved protective housing to protect it from damage and having a novel handle portion which simplifies handling the assembly while removing and replacing it.

In carrying out my invention, I provide a quadrangular cluster of coils and a quadrangular cluster of pole pieces having extensions forming cores for the coils. I also provide a moving system in the form of a record-engaging stylus having connection with a moving magnetic member disposed between the quadrangular cluster of pole pieces so that the stylus in engagement with the channels of the record groove causes the magnetic member to move in paths towards and away from the pole pieces which are arranged in oppositely disposed pairs. In order to provide a moving system of minimum mass, the coils, pole pieces and magnetic member are disposed at an angle to the record surface which causes a deviation in the movement of the magnetic member with respect to the normal planes presented by the channels of the record groove. To eliminate and minimize cross-talk, I provide compensation for this deviation in the arrangement of the quadrangular cluster of pole pieces by varying the spacing between the edges of adjacent pole pieces or by arranging them in a generally diamond shape, or both. I also provide the moving system in an improved removable form having a tubular housing at one end encasing part of the moving system and insertable between the cluster of pole pieces and a convenient handle portion at the other end. The handle may be readily grasped by the user in removing or replacing the removable system and it also may be color-coded to indicate the type of stylus. In addition, the housing and handle serve to protect the moving system and also to guide the moving system into proper position when it is inserted in the cartridge.

Figures 6, 7, 8, 9:
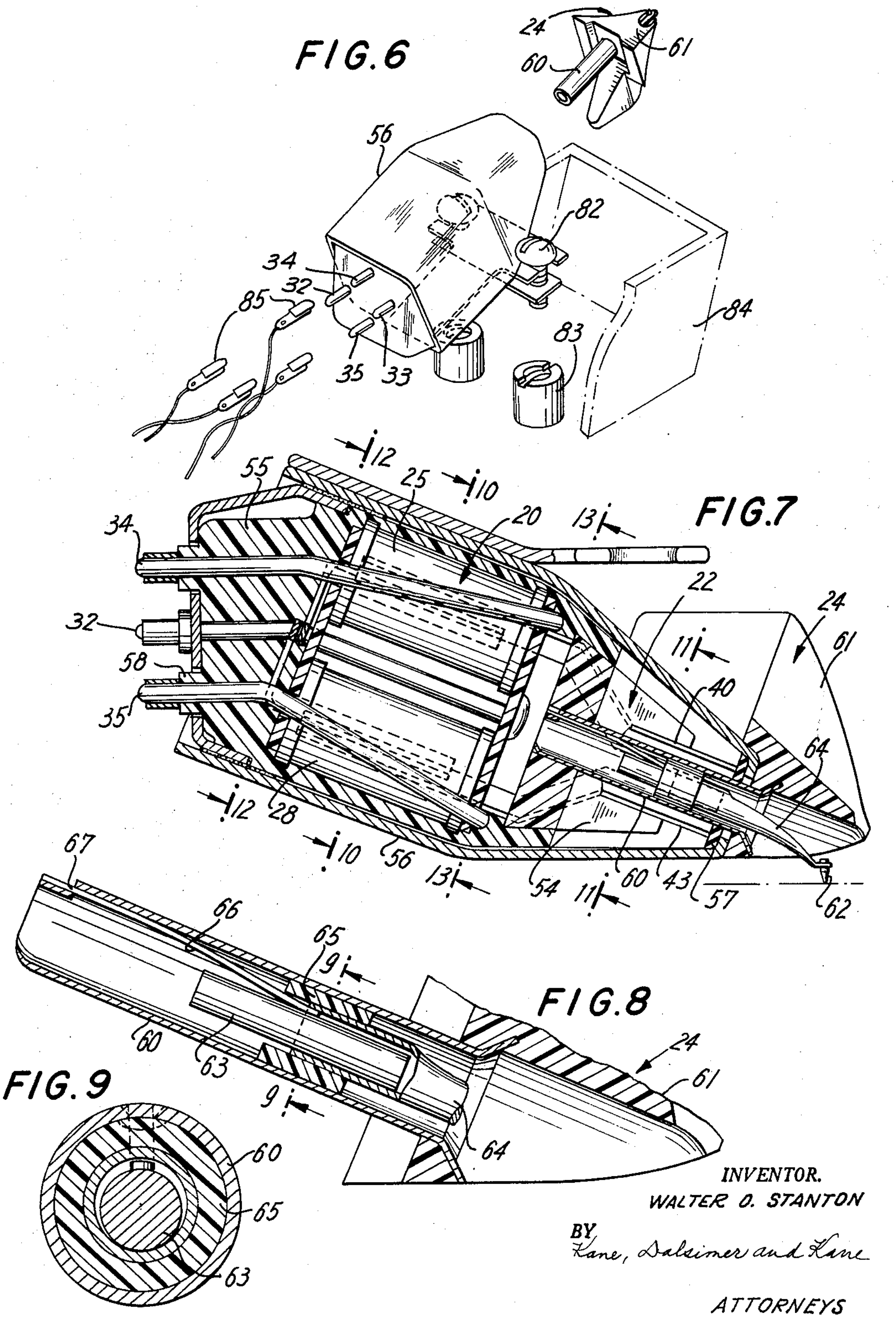
FIG. 6 is an exploded view illustrating the moving system assembly removed from the cartridge and showing associated electrical connections and portions of a tone arm with which the pickup may be assembled.
FIG. 7 is a longitudinal sectional view through the pickup.
FIG. 8 is a fragmentary longitudinal sectional view through a portion of the moving system assembly.
FIG. 9 is a cross-sectional view in the direction of the arrows on the line 9—9 of FIG. 8.
Figure 10:
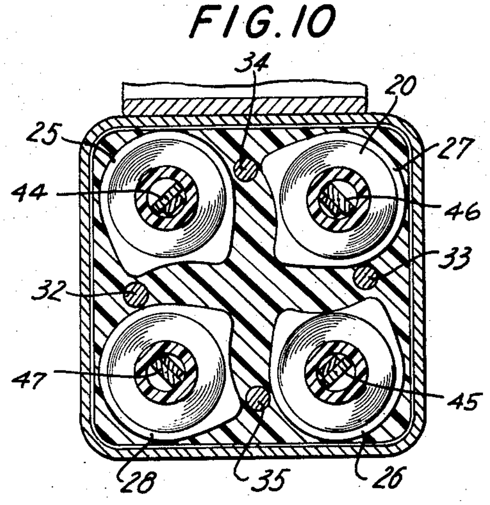
FIGS. 10, 11, 12 and 13 are sectional views in the direction of the arrows taken on the correspondingly numbered lines of FIG. 7.
Figure 11:
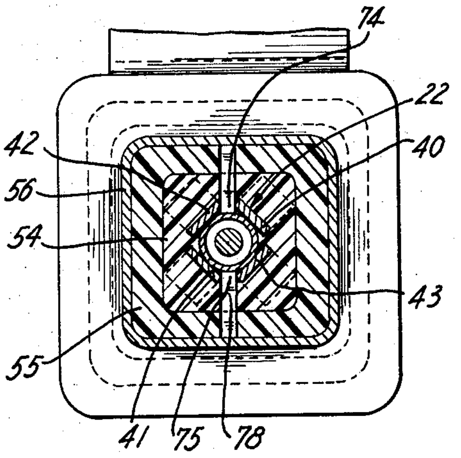

My improved pickup comprises a current generating system shown generally at 20 in FIGS. 7 and 10, a flux path shown generally at 22 in FIGS. 7 and 11 and a replaceable moving system assembly shown generally at 24 in FIGS. 1 to 8.

The current generating system comprises two pairs of current generating coils arranged in a quadrangular (preferably rectangular) cluster with the coils in each pair being arranged in diagonally opposite relationship. Thus, it will be seen that coils 25 and 26 form one pair of coils for one stereo channel and coils 27 and 28 form the other pair of coils for the other stero channel.

Figure 16:
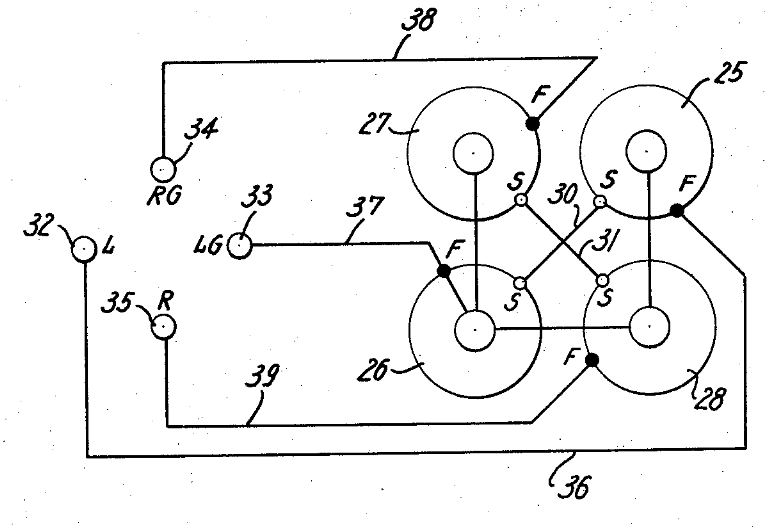
FIG. 16 is a circuit diagram illustrating the electrical circuit of the current generating system.

As shown, the coils consist of a hollow spool having a winding thereon and the windings for the two coils in each pair are connected in series aiding or additive for the generated signal and in series opposition or hum bucking relationship for stray currents and extraneous fields. For this purpose, one end of the winding in each of the coils 25 and 26 is connected together by lead 30 and one end of each of the windings of coils 27 and 28 is connected together by a lead 31 as shown in FIG. 16.

Terminal posts 32, 33, 34 and 35 project outwardly at one end of the cartridge for connection to the leads of the preamplifier and these posts or prongs extend inwardly between the coils and are suitably connected to the other ends of the windings of the respective coils. Thus, terminal post 32 is connected by lead 36 to the other end of the winding of coil 25; terminal post 33 is connected by lead 37 to the other end of the winding of coil 26; terminal post 34 is connected by lead 38 to the other end of the winding of coil 27 and terminal post 35 is connected by lead 39 to the other end of the winding of coil 28 as shown most clearly in FIGS. 13 and 16. Thus, it will be seen that the windings of coils 25 and 26 are connected in series through the terminal posts 32 and 33 which, in turn, can be connected to the leads of the preamplifier for one channel. Similarly, the windings of coils 27 and 28 are connected in series with the terminal posts 34 and 35 which, in turn, can be connected to the leads of the preamplifier of the other channel. As previously indicated, the connections and windings should be such that the coils are in series aiding or additive for the generated signal and in series opposed for stray currents and extraneous fields.

The flux path means 22 comprises two pairs of pole pieces all laterally spaced from each other and similarly arranged as the coils in a quadrangular cluster (preferably rectangular) with the pole pieces in each pair being arranged in diagonally opposite relationship. Thus, pole pieces 40 and 41 of one stereo channel are arranged in confronting, opposed, parallel relationship and form one pair and pole pieces 42 and 43 of the other channel are arranged in similar relationship and form the other pair.

The pole pieces are made of magnetic material, preferably a material of high magnetic permeability, and are provided with extensions of the same material which are preferably integral therewith and flare outwardly and then extend in parallel relationship through the centers of the respective coils, forming cores for the coils. For this purpose, I may use any suitable magnetic material such as iron, nickel or alloys or mixtures thereof.

The extensions for the respective pole pieces 40–43 are indicated by the numerals 44, 45, 46 and 47 and they form cores for the coils 25–28. At the opposite ends from the pole pieces the cores 44–47 are connected together in pairs by U-shaped members of magnetic material, preferably of high magnetic permeability. Thus, one pair of cores 44 and 45 are connected together by magnetic member 48 and the other pair of cores 46 and 47 are connected by magnetic member 49 with the overlapping portions of the members 48 and 49 being separated by a layer of non-magnetic insulating material as shown at 50.

Figures 12, 13, 14, 15:
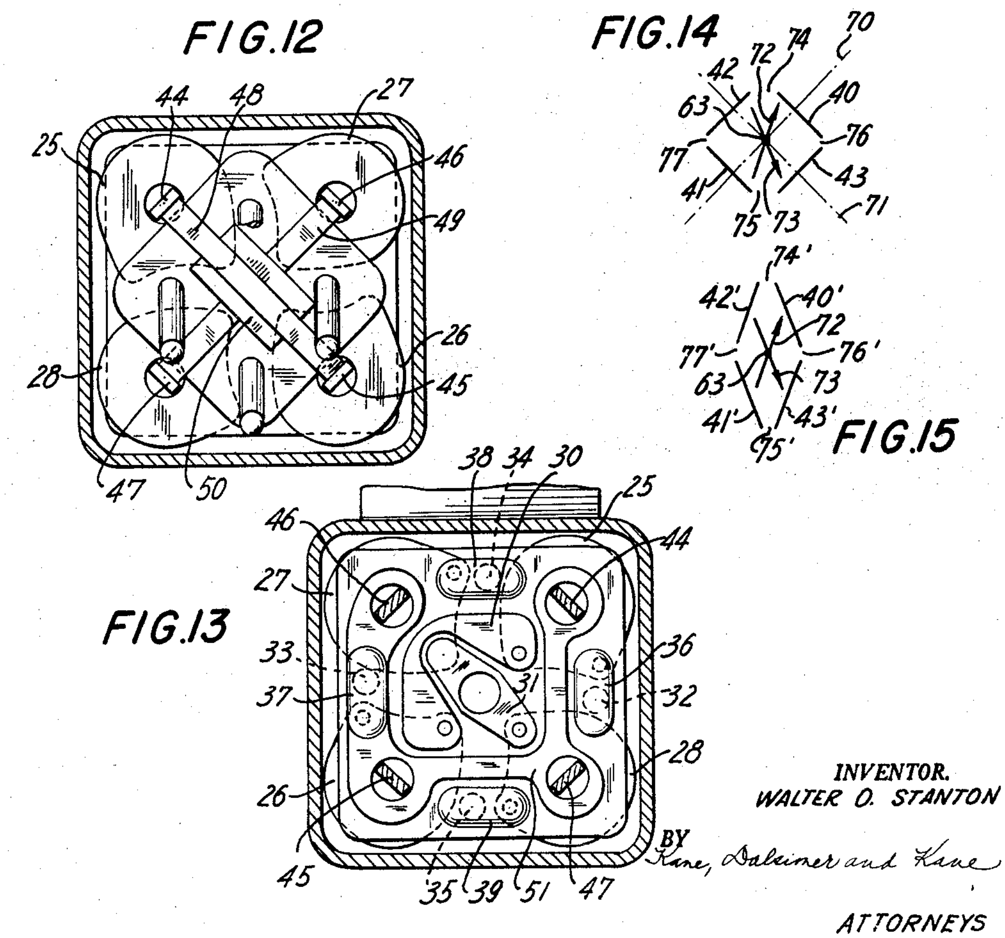
FIG. 14 is a diagram illustrating the deviation in movement between the moving system and the pole pieces as a result of the angular position of the parts with respect to the record disc and also illustrating one method of magnetically compensating for the deviation.
FIG. 15 is a similar diagram but showing an alternate method of magnetically compensating for the deviation.

The entire flux path system is preferably electrically grounded by a strip 51 of non-magnetic electrically conducting material which extends between the cores 44–47 and is connected to electrical terminal post 33 as shown most clearly in FIG. 13.

The current generating system and the flux path means described above form the fixed parts of my pickup. The current generating system may be pre-assembled with the terminal posts or prongs and the leads connected together to hold the pre-assembled parts in proper relationship. The flux path means, including the pole pieces and the cores or extensions, may similarly be pre-assembled and held in place by being imbedded in a suitable insulating resin such as polystyrene or polyester material as indicated at 54 in FIGS. 7 and 11. Thereafter, the pole pieces or extensions are projected through the hollow spools of the current generating coils, the U-shaped magnetic members 48 and 49 are connected to the opposite ends thereof and the entire assembly may be imbedded in a suitable insulating resin of the type mentioned above such as polystyrene or polyester as indicated at 55. The resin serves to protect the permanent parts of the pickup, to provide suitable insulation, and to retain them in properly assembled relationship. The imbedding of the respective parts may be accomplished by injection molding, by placing the assembled parts in the mold prior to injecting the resin.

Figure 1:
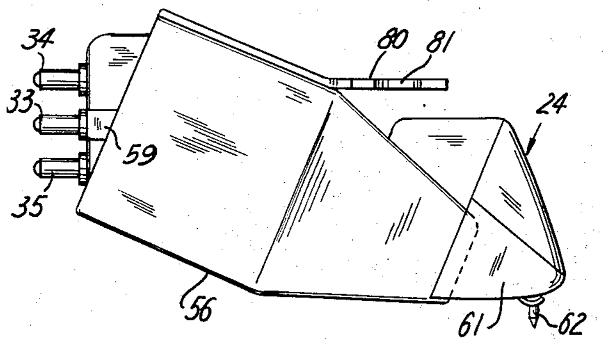
FIG. 1 is a side elevational view of one form of phonograph pickup embodying my invention.
Figure 4:
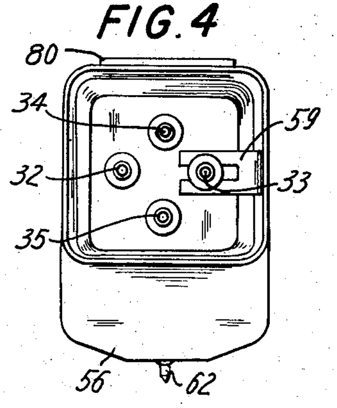
FIGS. 4 and 5 are rear and front elevational views.
Figure 2:
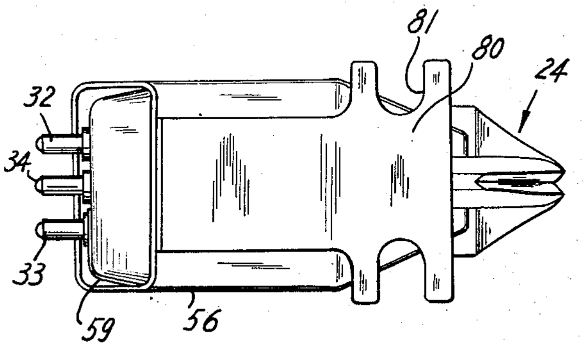
FIGS. 2 and 3 are top and bottom plan views, respectively.
Figure 5:
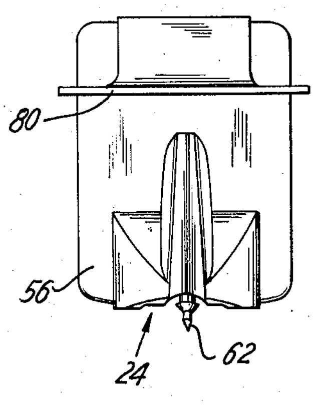
Figure 3:
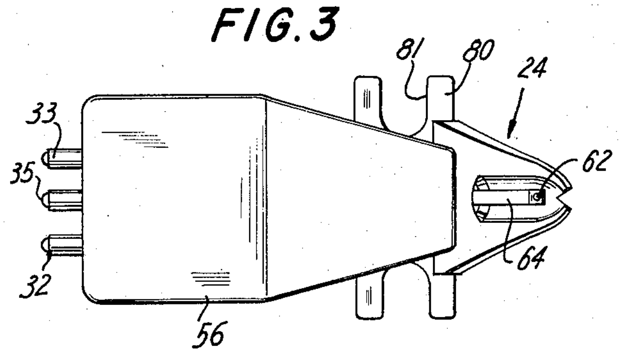

After the assembly of permanent parts has thus been made, the entire assembly is preferably encased in a shielding casing 56 made of an electrically conducting, magnetic material such as a ferrous metal or an iron-nickel alloy. The ends of the pole pieces are suitably insulated from the casing as by a washer of insulating material as shown at 57 in FIG. 7 and the electrical terminal prongs 44–47 are also insulated therefrom by suitable insulating plugs 58 integral with the resin matrix. A removable ground connection 59 may be provided between lead 33 and the casing as shown in FIG. 4.

The moving system assembly 24 is provided with a suitable housing in the form of a tubular member 60 and made of non-magnetic electrically conducting material connected at its outer end to a handle portion 61, preferably made of a plastic or resin material. Mounted inside the tubular member 60 for oscillatory motion is a moving system having a stylus 62, preferably in the form of a diamond or other jewel or gem of hard, long-wearing material suitably connected to a magnetic member, such as permanent magnet 63, as by a connecting tube 64 made of a light, non-magnetic material such as aluminum.

The tubular housing member 60 is of a size and length to fit between the pole pieces 40–43 with the end of the magnetic member or permanent magnet disposed between the pole pieces. The tubular member has a sliding frictional fit with the washer 57 and with the pole pieces so that it may be readily assembled therewith and can be removed and replaced when desired but will be frictionally held in place when in use.

The forward end of the tubular housing member 60 flares outwardly and is imbedded in the plastic material of the handle portion 61 so as to be held in permanent assembly therewith. The outer lower portion of the handle member is provided with an opening communicating with the inside of the tube 60 and the aluminum connector 64 and the stylus 62 project outwardly through the opening so that the stylus may engage a record groove. The handle portion is of tapered shape and has an upwardly projecting wing which may be conveniently grasped by the user to facilitate its removal and replacement.

The moving system is suitably mounted so that it may oscillate in response to the modulations of the two channels of the record groove. For this purpose, I provide a bushing 65 made of flexible, resilient material such as natural or synthetic rubber or a resilient plastic between the aluminum connector 64 and the tubular housing 60 The bushing 65 serves as a fulcrum about which the moving system oscillates when the stylus responds to the modulations of the two channels of the record groove. It also performs a damping function to dampen the oscillations. The bushing also helps to normally retain the moving system in centered position in the housing and to return it to centered position after it has oscillated. For this purpose, I may also provide a tie wire such as shown at 66 extending between the slitted end 67 of the tubular housing and the aluminum connector 64. In this connection, the tie wire may be frictionally held in place by the slit at the end of the housing and by being wedged between the permanent magnet 63 and the end of the aluminum connector 64.

In order to minimize record wear, it is desirable that the mass of the moving system be held to a minimum. For this purpose, the jewel stylus is made relatively small, the magnetic member or permanent magnet should be as small and light as possible consistent with adequate magnetic flux or strength to insure sufficient generated signal current output and the tubular aluminum connector 64 between the stylus and the magnet should be as short and light as possible. By disposing the cluster of current generating coils as well as the pole pieces and moving system at an angle to the plane of the record disc (shown in dotted lines in FIG. 7), the size and mass of the moving system can be minimized. However, this angular disposition of the parts causes a deviation in the movement of the magnetic member which gives rise to cross-talk between the channels. I have found that this deviation can be overcome by providing compensation in the arrangement of the pole pieces. The deviation resulting from the angular disposition is diagrammatically illustrated in FIGS. 14 and 15 which also show two different methods of compensating for the deviation.

Referring to FIG. 14, the four pole pieces 40–43 are illustrated diagrammatically as is the magnetic member or permanent magnet 63. The tubular housing and other parts are omitted for purposes of clarity. When the magnetic member is caused to move between the pair of pole pieces 40 and 41, it causes a flow of flux in the flux path with the result that current is generated in the coils 25 and 26 which, through terminals 32 and 33, is fed to the preamplifier of one channel of the stereo output. Similarly, when the magnetic member moves between the pole pieces 42 and 43, flux is caused to flow in that flux path which, in turn, causes a current to be generated by coils 27 and 28 which are fed from terminals 34 and 35 to the preamplifier of the other channel of the stereo output.

When the coils, pole pieces and moving system are disposed horizontally or parallel to the surface of the record disc, the movement of the magnet is parallel to the two channels of the record groove and the two paths of movement are substantially at right angles to each other as indicated in dotted lines at 70 and 71 in FIG. 14. Thus, when the magnetic member moves along the path 70 towards and away from the pole pieces 40 and 41, it moves parallel to the pole pieces 42 and 43 and no flux flow is created in the flux path of pole pieces 42 and 43. Similarly, when the magnetic member moves along the path 71, it moves parallel to the pole pieces 40 and 41 with the result that no flux flow takes place in the flux path of these pole pieces.

However, when the coils, pole pieces and moving system are disposed at an angle to the record surface, it gives rise to a deviation in the movement of the magnetic member and the greater the angle, the greater the deviation. The deviation is indicated in FIG. 14 by the full lines 72 and 73 which terminate in arrows to indicate the direction of movement of the magnetic member when the assembly is disposed at an angle. Thus, it will be seen that when the magnetic member moves towards pole piece 40 in one pair of pole pieces, it also approaches pole piece 42 in the other pair and that when it moves towards pole piece 41, it also approaches pole piece 43. Similarly, when it moves towards pole piece 42, it approaches pole piece 40 and when it moves towards pole piece 43, it approaches pole piece 41. This would give rise to cross-talk between the channels.

I have found that the cross-talk can be eliminated in a simple manner by increasing the diagonally opposite spacing 74 and 75 between the lateral edges of the pole pieces towards which the magnetic member moves and approaches with respect to the other two diagonally opposite spaces 76 and 77. In this way, the greater proximity between the pole pieces 40 and 43 and 42 and 41, respectively, compensates for the increased flux density which results from the deviation. This can be accomplished in a simple fashion in the manner illustrated in FIGS. 7 and 11 by cutting through the resin matrix 55 and 54 surrounding the pole pieces as shown at 78. Sufficient material is then cut from the adjacent lateral edges of the pole pieces 40 and 42 and 41 and 43, respectively, to provide the enlarged spacings 74 and 75.

Compensation in arrangement of the pole pieces may also be provided in the manner illustrated in FIG. 15. In this arrangement, the pole pieces indicated at 40′, 41′, 42′ and 43′ have been arranged in a generally diamond shape so that the two pole pieces in each pair are parallel to each other and are also parallel to the path of movement of the magnet between the other two pole pieces. As in FIG. 14, the paths of movement of the magnetic member or magnet 63 when the assembly is angularly disposed are shown by the lines 72 and 73. In certain instances, it might be desirable to combine the two systems of compensation so that the cross-sectional arrangement of the pole pieces is diamond-shaped but with the respective pairs of pole pieces arranged not quite parallel to the path of movement of the magnet between the other two pole pieces. Under those circumstances, the diagonally opposite spaces 74′ and 75′ should be increased slightly with respect to the other two spaces 76′ and 77′ so as to completely compensate for the deviation.

In using my improved pickup, it is mounted in the tone arm of a phonograph or record player in any suitable manner. For this purpose, I may provide a holding strap 80 suitably secured to the upper surface of the metal casing 56 and having screw-receiving recesses 81 through which screws 82 may be secured to the mounting posts 83 of a tone arm 84 as indicated in FIG. 6.

Figure 17:
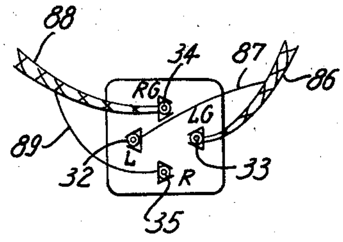
FIGS. 17, 18 and 19 are elevational views of the terminal block of the pickup illustrating alternate electrical connections which may be used for both stereophonic and monaural phonograph systems.
Figure 18:
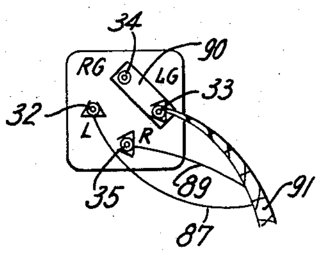

My improved pickup may be connected to either a four-lead or three-lead stereo system and may also be connected to a monaural system reproducing laterally cut records. It is recommended that the electrical connections to the terminal posts 32–35 be made by means of terminal clips 85 as shown in FIG. 6. Where four leads are provided in the stereo system as shown in FIG. 17, the shield or ground lead 86 of the left channel is connected to terminal 33 while the other lead 87 of the left channel is connected to terminal 32. The shield or ground lead 88 of the right channel is connected to terminal 34 and the other lead of the right channel is connected to terminal 35 as shown in FIG. 17. Where the stereo system has three leads as shown in FIG. 18, a terminal strap 90 is connected between the terminals 33 and 34. The shield or ground lead 91 for the two channels may then be connected to terminal 33 and the other leads 87 and 89 for the left and right channels, respectively, are connected to the terminals 32 and 35, respectively.

Figure 19:
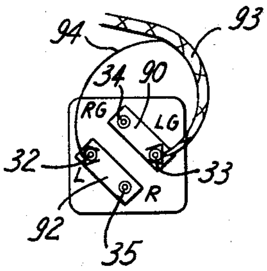

Most stereo preamplifiers provide a mode switch with a position labelled "MONO" and when switched to this position, the two pickup channels are in parallel and may be used in connection with a monaural laterally cut record. When used with a monoaural system having a single preamplifier or with stereo amplifiers that do not provide a mode switch, then the arrangement shown in FIG. 19 may be employed, wherein terminal strap 90 is connected between terminals 33 and 34 and another terminal strap 92 is connected between terminals 32 and 35. The shield or ground lead of the system indicated at 93 may then be connected to terminal 33 and the other lead 94 may be connected to terminal 32.

It will be appreciated that when the pickup is assembled with a tone arm in the manner heretofore described and the stylus is engaged with a record groove, the moving system, and specifically the magnetic member or permanent magnet 63, is caused to oscillate in response to the modulations with bushing 65 serving as the fulcrum for the moving system. Due to the angular disposition of the parts, there is a deviation in the movement of the magnetic member and in a stereophonic system this could give rise to cross-talk. As indicated, the compensation which I provide in the arrangement of the pole pieces eliminates or prevents this cross-talk.

It will be seen that the moving system assembly 24 may be readily removed and replaced when desired. Different moving systems may be provided for different speed records and these may be color-coded by forming the handle portion 61 of different color resins. The operator will then know which moving system to insert for a particular speed record. Also, when the stylus is worn, the moving system assembly may be readily replaced with a new assembly. It will also be appreciated that my pickup is compact, that the permanent parts of the assembly are permanently molded in a resin matrix protecting the parts and holding them in proper relationship. Also, as indicated, my pickup may be used in either stereophonic or monaural sound reproducing systems.

In the accompanying drawings, I have illustrated a pickup of the moving magnet type in which the magnetic member 63 is a permanent magnet and my invention has special application to a pickup of this type. However, my invention is also applicable to other types of magnetic pickups in which the magnetic member is an armature and permanent magnets are disposed in the flux paths.

Modifications may be made in the illustrated and described embodiment of my invention without departing from the invention as set forth in the accompanying claims.

I claim:

1. A magnetic stereophonic sound reproducer for use with phonograph record discs having a sound groove with two channels disposed substantially at right angles to each other comprising: a supporting structure; a pair of current generators mounted on the supporting structure and each including a pair of coils connected in series additive for the generated signal and arranged in a quadrangular cluster in parallel relationship with the coils in each pair being in diagonally opposite relationship; means providing a pair of flux paths each including first and second spaced proximately positioned confronting pole pieces made of magnetic material extending into the respective pairs of coils from one end thereof and forming cores for the coils, said pole pieces being likewise arranged in a quadrangular cluster with the first and second pole pieces in each pair being arranged in opposite, parallel relationship with the first pole pieces in the respective pairs being disposed at an included angle to each other and facing in a direction towards the surface of a record disc used therewith and with the second pole pieces in the respective pairs being disposed at a similar included angle to each other and facing away from the record surface and said flux paths also including a pair of magnetic means extending between the respective extensions in each pair at the opposite ends of the coils from the pole pieces; and a moving system assembly including a stylus, a permanent magnet having connection with the stylus to move therewith and mounting means for supporting the moving system for oscillatory movement so that the pole of the magnet moves in paths towards and away from the opposite pole pieces in each pair and in inductive relationship therewith, said coils, pole pieces and permanent magnet being mounted at an angle to the plane of a record disc engaged by the stylus so that the magnet when moved by the stylus in engagement with a channel of the record disc is caused to deviate from paths parallel to the channels of the record groove, said pole pieces being arranged in a generally diamond shaped cluster with the apices of the diamond being located at the included angles between the first pole pieces of the respective pairs and between the second pole pieces of the respective pairs.

2. A magnetic stereophonic sound reproducer for use with phonograph record discs having a sound groove with two channels disposed substantially at right angles to each other comprising: a supporting structure; a pair of current generators mounted on the supporting structure and each including a pair of coils connected in series additive for the generated signal and arranged in a quadrangular cluster in parallel relationship with the coils in each pair being in diagonally opposite relationship; means providing a pair of flux paths each including first and second spaced proximately positioned confronting pole pieces made of magnetic material extending into the respective pairs of coils from one end thereof and forming cores for the coils, said pole pieces being likewise arranged in a quadrangular cluster with the first and second pole pieces in each pair being arranged in opposite, parallel relationship with the first pole pieces in the respective pairs being disposed at an included angle to each other and facing in a direction towards the surface of a record disc used therewith and with the second pole pieces in the respective pairs being disposed at a similar included angle to each other and facing away from the record surface and said flux paths also including a pair of magnetic means extending between the respective extensions in each pair at the opposite ends of the coils from the pole pieces; and a moving system assembly including a stylus, a permanent magnet having connection with the stylus to move therewith and mounting means for supporting the moving system for oscillatory movement so that a pole of the magnet moves in paths towards and away from the opposite pole pieces in each pair and in inductive relationship therewith, said coils, pole pieces and permanent magnet being mounted at an angle to the plane of a record disc engaged by the stylus so that the magnet when moved by the stylus in engagement with a channel of the record disc is caused to deviate from paths parallel to the channels of the record groove, said cluster of pole pieces being arranged so as to have spaces between the lateral edges of the pole pieces with the two diagonally disposed spaces between the first pole pieces in the respective pairs and between the second pole pieces in the respective pairs being larger than the other two spaces.

3. A magnetic stereophonic sound reproducer for use with phonograph record discs having a sound groove with two channels disposed substantially at right angles to each other comprising: a pair of current generators mounted on the supporting structure and each including a pair of coils connected in series additive for the generated signal and arranged in a quadrangular cluster in parallel relationship with the coils in each pair being in diagonally opposite relationship; means providing a pair of flux paths each including first and second spaced proximately positioned confronting pole pieces made of magnetic material and having extensions extending into the respective pairs of coils from one end thereof and forming cores for the coils, said pole pieces being likewise arranged in a quadrangular cluster with the first and second pole pieces in each pair being arranged in opposite, parallel relationship with the first pole pieces in the respective pairs being disposed at an included angle to each other and facing in a direction towards the surface of a record disc used therewith and with the second pole pieces in the respective pairs being disposed at a similar included angle to each other and facing away from the record surface and said flux paths also including a pair of magnetic means extending between the respective extensions in each pair at the opposite ends of the coils from the pole pieces; and a moving system assembly including a stylus, a permanent magnet having connection with the stylus to move therewith and mounting means for supporting the moving system for oscillatory movement so that a pole of the magnet moves in paths towards and away from the opposite pole pieces in each pair and in inductive relationship therewith, said coils, pole pieces and permanent magnet being mounted at an angle to the plane of a record disc engaged by the stylus so that a magnet when moved by the stylus in engagement with a channel of the record disc towards one pole piece of the first pair approaches closer to a first pole piece of the other pair and when moved towards the second pole piece of the first pair approaches towards the second pole piece of the other pair, said pole pieces having spaces between the lateral edges thereof with the diagonally opposite spaces between the first pole pieces of the respective pairs and between the second pole pieces of the respective pairs towards which the magnet thus moves and approaches being relatively greater than the other two diagonally opposite spaces so as to compensate for the departure from parallel movement.

4. A magnetic stereophonic sound reproducer for use with phonograph record discs with a sound groove having two channels disposed substantially at right angles to each other as set forth in claim 3 in which the pole pieces are arranged in a generally rectangular cluster.

5. A magnetic stereophonic sound reproducer for use with phonograph record discs with a sound groove having two channels disposed substantially at right angles to each other as set forth in claim 3 in which the pole pieces are arranged in a generally diamond-shaped cluster with the apices of the diamond being disposed at the angles where the relatively larger spaces are provided.

6. A magnetic stereophonic sound reproducer for use with phonograph record discs with a sound groove having two channels disposed substantially at right angles to each other as set forth in claim 3 in which the current generating coils and a major portion of the means providing the flux paths are encased in a resin matrix and a magnetically and electrically shielding casing is disposed around the the assembly.

7. A magnetic stereophonic sound reproducer for use with phonograph record discs with a sound groove having two channels disposed substantially at right angles to each other as set forth in claim 3 having a casing for said moving system supporting the same for oscillation and including a tubular housing encasing the magnet and an enlarged, tapered handle portion mounted on the end of the tubular housing and having an opening through which the stylus projects.

8. A replaceable moving system assembly for a magnetic stereophonic sound reproducer having a cluster of current generating coils, a cluster of pole pieces arranged to form a socket therebetween, cores for said coils connected to said pole pieces and a supporting structure for said reproducer, said moving system assembly comprising a housing for said moving system including a tubular member open at one end and being of a size to have sliding engagement with the socket between the pole pieces, a moving member including a magnet mounted in said tubular member for oscillatory movement, a record engaging stylus mounted on said moving member and projecting outwardly from the open end of the tubular member so as to be engageable with a record groove to cause oscillation of the moving member in response to modulations of the record groove, an elongated longitudinally extending spring wire connected between the tubular member and the moving member so as normally to center the moving member with respect to the housing, and an enlarged handle portion made of plastic material mounted at the open end of the tubular member and having an opening through which the stylus normally projects, said handle portion having an abutment surface engageable with a surface of the supporting structure to serve as a stop and positioning member to properly position the magnet relative to the pole pieces and to properly orient the direction in which the stylus projects, said opening in the handle portion being in the form of a relatively deep groove-like recess with the stylus normally projecting beyond the sides of the groove and with the groove being of a size to accommodate the entire stylus so as to protect it when it is subjected to impact.

9. A magnetic stereophonic sound reproducer for use with phonographic record discs having a sound groove with two channels disposed substantially at right angles to each other comprising: a support structure, a pair of current generators mounted on the supporting structure and each including a coil, means providing a pair of flux paths each including first and second spaced proximately positioned confronting pole pieces made of magnetic material and having extensions projecting through the respective coils and forming cores for the coils, said pole pieces being arranged in a quadrangular cluster with the first and second pole pieces in each pair being disposed in opposite, parallel relationship with the first pole pieces in the respective pairs being disposed at an included angle to each other and facing in a direction towards the surface of a record disc used therewith and with the second pole pieces in the respective pairs being disposed at a similar included angle to each other and facing away from the record surface, and a moving system assembly including a stylus, a movable magnetic member having a pole connected to the stylus to move therewith and mounting means for supporting the moving system for oscillatory movement so that the pole of the magnetic member moves in paths towards and away from the opposite pole pieces in each pair and in inductive relationship therewith, said pole pieces and moving system being mounted at an angle to the plane of a record disc engaged by the stylus so that the magnetic member when moved by the stylus in engagement with a channel of the record disc is caused to deviate from paths parallel to the channels of the record groove, said pole pieces being arranged in a generally diamond-shaped cluster with the apices of the diamond being located at the included angles between the first pole pieces of the respective pairs and between the second pole pieces of the respective pairs to compensate for said deviation in movement of the magnet to thereby minimize cross-talk.

10. A magnetic stereophonic sound reproducer for use with phonographic record discs having a sound groove with two channels disposed substantially at right angles to each other comprising: a support structure, a pair of current generators mounted on the supporting structure and each including a coil, means providing a pair of flux paths each including first and second spaced proximately positioned confronting pole pieces made of magnetic material having extensions projecting through the respective coils and forming cores for the coils, said pole pieces being arranged in a quadrangular cluster with the first and second pole pieces in each pair being disposed in opposite, parallel relationship with the first pole pieces in the respective pairs being disposed at an included angle to each other and facing in a direction towards the surface of a record disc used therewith and with the second pole pieces in the respective pairs being disposed at a similar included angle to each other and facing away from the record surface, and a moving system assembly including a stylus, a movable magnetic member having a pole connected to the stylus to move therewith and mounting means for supporting the moving system for oscillatory movement so that the pole of the magnetic member moves in paths towards and away from the opposite pole pieces in each pair and in inductive relationship therewith, said pole pieces and moving system being mounted at an angle to the plane of a record disc engaged by the stylus so that the magnetic member when moved by the stylus in engagement with a channel of the record disc is caused to deviate from paths parallel to the channels of the record groove, said pole pieces being arranged so as to have spaces between the lateral edges of the pole pieces with the two diagonally opposite spaces between the first pole pieces in the respective pairs and between the second pole pieces in the respective pairs being larger than the other two spaces.

References Cited in the file of this patent

UNITED STATES PATENTS 3,060,281 Snepvangers ---------- Oct. 23, 1962
3,077,521 Ahrens et al. ------------ Feb. 12, 1963
3,077,522 Gunter et al. ------------ Feb. 12, 1963

OTHER REFERENCES

Audio, May 1959, pp. 19–21, 46 and 47.